United States Patent
Maeno et al.

(10) Patent No.: US 9,335,402 B2
(45) Date of Patent: May 10, 2016

(54) APPARATUS AND METHOD FOR DETECTING TARGET OBJECT

(71) Applicant: Furuno Electric Co., Ltd., Nishinomiya (JP)

(72) Inventors: Hitoshi Maeno, Nishinomiya (JP); Yasunobu Asada, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 429 days.

(21) Appl. No.: 13/922,176

(22) Filed: Jun. 19, 2013

(65) Prior Publication Data
US 2013/0342388 A1   Dec. 26, 2013

(30) Foreign Application Priority Data

Jun. 21, 2012  (JP) .................................. 2012-140097
Apr. 4, 2013   (JP) .................................. 2013-078980

(51) Int. Cl.
*G01S 7/02*   (2006.01)
*G01S 7/28*   (2006.01)
*G01S 13/22*  (2006.01)

(52) U.S. Cl.
CPC ............... *G01S 7/2813* (2013.01); *G01S 7/023* (2013.01); *G01S 13/22* (2013.01)

(58) Field of Classification Search
CPC ......... G01S 7/023; G01S 7/28; G01S 7/2813; G01S 7/282; G01S 13/10; G01S 13/106; G01S 13/12; G01S 13/22
USPC ............... 342/70–72, 82, 88, 90, 94, 95, 134, 342/137, 159, 202
See application file for complete search history.

(56) References Cited

U.S. PATENT DOCUMENTS

| | | | | | |
|---|---|---|---|---|---|
| 4,739,330 | A * | 4/1988 | Lazarus | ............... | G01S 7/034 342/122 |
| 5,128,683 | A * | 7/1992 | Freedman | ............... | G01S 7/032 342/158 |
| 5,150,125 | A * | 9/1992 | Hager | ............... | G01S 13/20 342/120 |
| 6,888,491 | B2 * | 5/2005 | Richter | ............... | G01S 7/023 342/129 |
| 7,518,547 | B2 * | 4/2009 | Winstead | ............... | G01S 7/4021 342/120 |
| 7,522,092 | B2 * | 4/2009 | Okai | ............... | G01S 7/023 342/159 |
| 8,184,040 | B2 * | 5/2012 | Takase | ............... | G01S 7/2926 342/11 |
| 2004/0066323 | A1 * | 4/2004 | Richter | ............... | G01S 7/023 342/70 |
| 2008/0246648 | A1 * | 10/2008 | Winstead | ............... | G01S 7/285 342/94 |

FOREIGN PATENT DOCUMENTS

JP         2009068896 A       4/2009

* cited by examiner

*Primary Examiner* — Peter Bythrow
(74) *Attorney, Agent, or Firm* — Alleman Hall McCoy Russell & Tuttle LLP

(57) ABSTRACT

A target object detection apparatus is provided. The apparatus includes a transmitter, a receiver, a threshold determiner, a parameter setter, a parameter selector, and a timing controller. The transmitter repeatedly transmits a transmission pulse at a transmission timing. The receiver receives a reception signal at a reception timing set based on the transmission timing. The threshold determiner determines whether an amplitude value of the reception signal exceeds a predetermined threshold at every sampling point and counts the number of sampling points at which the amplitude value of the reception signal exceeds the threshold. The parameter setter sets a plurality of different parameters for controlling the transmission timing. The parameter selector selects the parameter from the parameter settings, to minimize the number of sampling points counted by the threshold determiner. The timing controller controls the transmission timing, based on the parameter selected by the parameter selector.

20 Claims, 9 Drawing Sheets

APPARATUS AND METHOD FOR DETECTING TARGET OBJECT

CROSS-REFERENCE TO RELATED APPLICATION(S)

The application claims priority under 35 U.S.C. §119 to Japanese Patent Application No. 2012-140097, which was filed on Jun. 21, 2012, and Japanese Patent Application No. 2013-078980, which was filed on Apr. 4, 2013 the entire disclosure of which are hereby incorporated by references.

TECHNICAL FIELD

The present invention generally relates to an apparatus and method for detecting a target object.

BACKGROUND OF THE INVENTION

Among target object detection apparatuses, for example, a radar apparatus equipped on a ship generally detects target objects (e.g., other ships and buoys on the sea) by discharging radio waves and receiving reflection waves, and displays the detected target object on a display.

However, when radio waves are discharged from another radar apparatus existing around the radar apparatus of the ship, there is a case where the target object cannot be displayed accurately by the radar apparatus of the ship. This is because, reflection waves from the target object are superimposed on the radio waves from the other radar apparatus, and interference waves appear in the reflection waves. Therefore, the conventional radar apparatuses are configured to remove the interference waves by adding jitter to transmission pulses and scattering the interference waves in a time direction (e.g., JP2009-068896A). Such jitter is determined in advance based on, for example, a PRF (Pulse Repetition Frequency) and a transmission pulse width, which are used in radars.

The RPF and transmission pulse width used in the radars are different depending on the manufacturer and the type of the radar. Therefore, determining an effective pulse transmission method by comparing with all the other radars in advance is extremely difficult. In particular, since fixed radars have significantly larger pulse widths compared to the conventional magnetron radars, influence of interference cannot be completely prevented even by adding jitter in many cases.

SUMMARY OF THE INVENTION

The present invention is made in view of the above situation, and provides a target object detection apparatus that uses a transmission signal with wide pulse width (e.g., a fixed radar), reduces influence of an interference wave, and can appropriately catch a target object that is supposed to be detected originally.

According to one aspect of the present invention, a target object detection apparatus is provided. The apparatus includes a transmitter, a receiver, a threshold determiner, a parameter setter, a parameter selector, and a timing controller. The transmitter repeatedly transmits a transmission pulse at a transmission timing. The receiver receives a reception signal at a reception timing set based on the transmission timing. The threshold determiner determines whether an amplitude value of the reception signal exceeds a predetermined threshold at every sampling point, and counts the number of sampling points at which the amplitude value of the reception signal exceeds the threshold. The parameter setter sets a plurality of different parameters for controlling the transmission timing. The parameter selector selects the parameter from the parameters set by the parameter setter, to minimize the number of sampling points counted by the threshold determiner. The timing controller controls the transmission timing, based on the parameter selected by the parameter selector.

The device can be widely applied to an apparatus for detecting a target object by transmitting a transmission pulse and receiving a reflection wave from the target object, and based on an evaluation of the reception signal, the device adjusts a transmission timing of the transmission pulse to further reduce an influence from an interference wave.

The plurality of different parameters may include one or more kinds of physical quantities used for determining the transmission timings of repeatedly transmitting the transmission pulse.

The number of kinds of physical quantities may be at least two of a repetition frequency of the transmission pulse, a jitter amount, and a jitter pattern for determining a combination of the jitter amounts.

The transmission pulse may include transmission pulses having a plurality of different widths. A transmission order of the transmission pulses having the plurality of different widths may be determined based on the parameters.

The threshold determiner may select a first parameter and a second parameter from the plurality of parameters. The parameter selector may compare the counted number obtained with the first parameter, with the counted number obtained with the second parameter, and may select the parameter with a smaller counted number.

The threshold determiner may replace one of the first and second parameters that is non-selected, with a parameter that is neither the first parameter nor the second parameter.

The parameter setter may have a parameter storage for storing the plurality of parameters. The threshold determiner may select the first and second parameters from the plurality of parameters stored in the parameter storage, and the parameter with the smaller counted number may be selected by the parameter selector.

The threshold determiner may include a first threshold determining module for determining the threshold based on the first parameter, and a second threshold determining module for determining the threshold based on the second parameter. The target object detecting apparatus may further include a switch for outputting the reception signal at a predetermined cycle while switching the module between the first threshold determining module and the second threshold determining module. The threshold determination may be performed alternately by the first threshold determining module and the second threshold determining module at the predetermined cycle.

When the first parameter is selected as a result of the threshold determination, the first parameter may be outputted to the timing controller. When the second parameter is selected, the first parameter may be replaced with the second parameter, and the second parameter may be replaced with a third parameter that is different from the first and second parameters.

A parameter newly selected as the third parameter may be different from all the replaced parameters.

The transmission pulse may be an electromagnetic pulse, and the transmitter may include a rotary unit for changing an azimuth at which the transmission pulse is transmitted at a predetermined cycle.

The transmission pulse may be an electromagnetic pulse, and the transmitter may include a rotary unit for transmitting the transmission pulse in the entire circumferential direction at a predetermined cycle.

The sampling points may be counted for a predetermined azimuth range.

The sampling point may be within a predetermined distance range from the transmitter.

The predetermined distance range may be set to correspond to a period of time based on the transmission timing of the transmission pulse, the period of time being required for the transmission pulse transmission in the entire circumferential direction.

The parameter setter may set at least three kinds of parameters. The parameter selector may select the parameter to minimize the number of counted number among the at least three kinds of parameters.

The parameter selector may select the parameter every time a counted number of sampling points reaches a predetermined number.

When a predetermined number of sampling points is counted in addition to the counted number obtained with the selected parameter, the parameter selector may compare the counted number between the selected parameter and each of the other parameters to select a new parameter.

According to another aspect of the present invention, a transmission pulse control device is provided. The device is provided to a target object detection apparatus for detecting a target object by repeatedly transmitting a transmission pulse and receiving a reception signal from the target object. The device controls the transmission timing. The device includes a threshold determiner for determining whether an amplitude value of the reception signal exceeds a predetermined threshold at every sampling point, and counting the number of sampling points at which the amplitude value of the reception signal exceeds the threshold. The device also includes a parameter setter for setting a plurality of different parameters for controlling the transmission timing, a parameter selector for selecting the parameter from the parameters set by the parameter setter, to minimize the number of sampling points counted by the threshold determiner, and a timing controller for controlling the transmission timing and the reception timing from the target object, based on the parameter selected by the parameter selector.

According to another aspect of the present invention, a method of detecting a target object by repeatedly transmitting a transmission pulse and receiving a reception signal from the target object is provided. The method includes repeatedly transmitting the transmission pulse at a transmission timing, receiving the reception signal at a reception timing set based on the transmission timing, and setting a plurality of different parameters for controlling the transmission timing, the plurality of different parameters including the parameter for determining the transmission timing. The method also includes determining, based on each of the plurality of different parameters, whether an amplitude value of the reception signal exceeds a predetermined threshold at every sampling point, and counting the number of sampling points at which the amplitude value of the reception signal exceeds the threshold. The method further includes selecting the parameter from the plurality of different parameters to minimize the number of sampling points, and controlling the transmission timing and the reception timing from the target object, based on the selected parameter.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

[First Embodiment]

Hereinafter, a target object detection apparatus according to a first embodiment of the present invention is described with reference to the appended drawings.

The target object detection apparatus of the present invention can be widely applied to apparatuses that detect target objects by transmitting transmission pulses and receiving reflection signals from the target objects. In this embodiment, a radar apparatus for detecting a target object by transceiving electromagnetic waves is described as an example. The target object detection apparatus may also be applied to sonars for detecting a target object underwater by transceiving ultrasonic waves.

A radar apparatus according to this embodiment is a ship radar apparatus provided in, for example, a ship (hereinafter, referred to as "the ship") and for detecting a target object such as another ship, a buoy, or a bird that is on the sea.

Figure 1:
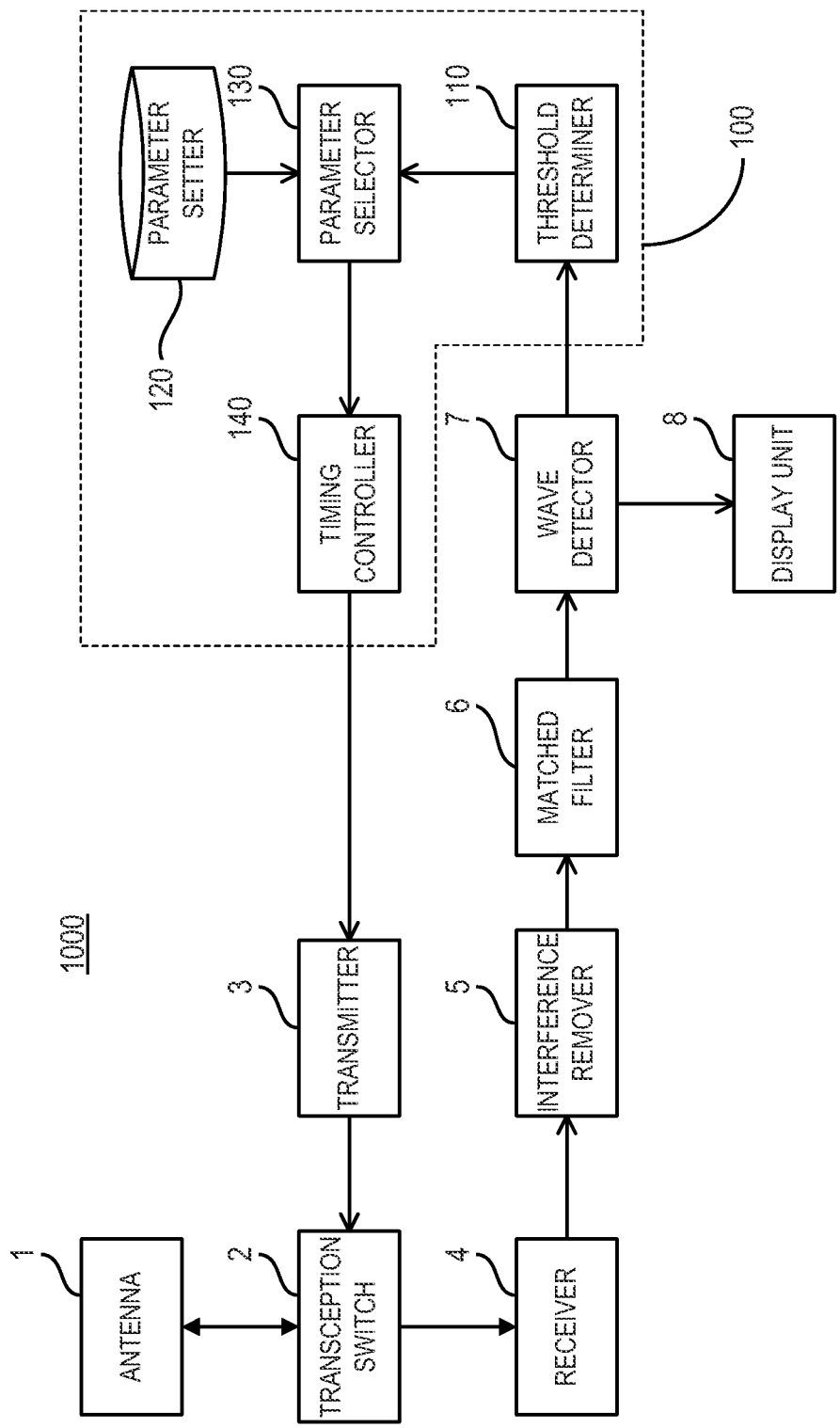
FIG. 1 is a block diagram showing a schematic configuration of a radar apparatus according to a first embodiment of the present invention.

A configuration of a radar apparatus 1000 of this embodiment is described with reference to FIG. 1. FIG. 1 is a block diagram showing a schematic configuration of the radar apparatus according to the first embodiment of the present invention.

As shown in FIG. 1, the radar apparatus 1000 includes an antenna 1, a transception switch 2, a transmitter 3, a receiver 4, an interference remover 5, a matched filter 6, a wave detector 7, a display unit 8, and a parameter adjustor 100. The parameter adjustor 100 includes a threshold determiner 110, a parameter setter 120, a parameter selector 130, and a timing controller 140. Hereinafter, each of the elements configuring the radar apparatus 1000 is described in detail.

In the radar apparatus 1000, the antenna 1 transmits a beam of a pulse-shaped radio wave (radar transmission signal) having a sharp directionality, and receives a reflection wave from a target object therearound. A beam width is, for example, 2°. The antenna 1 repeats the transmission and reception while rotating in a horizontal plane. The rotation cycle is, for example, 2.5 seconds. Hereinafter, an operation of transmission and reception within a period between a transmission of a radar transmission signal and immediately before the next transmission of the radar transmission signal is referred to as one sweep. A period of time corresponding to one sweep, in other words the transmission cycle, is one millisecond, for example.

The antenna 1 intensively discharges the radar transmission signals in a certain direction and receives radar reception signals including the reflection wave (target object signal) from the target object existing in that direction. The radar reception signals may include, other than a target object signal component, components such as a radio wave interference wave (interference signal) from another radar apparatus, and a noise of the receiver.

A distance from the radar apparatus 1000 to the target object is obtained based on a time length between a receiving period of time of the radar reception signals including the target object signal and a transmitting period of time of the radar transmission signals corresponding to the radar reception signals. An azimuth of the target object is obtained based on an azimuth of the antenna 1 when transmitting the radar transmission signal corresponding to the radar reception signal.

The transception switch 2 is configured to be connectable with the antenna 1. The transception switch 2 is configured to switch an output direction of a signal between the transmitter 3 and the receiver 4 with the antenna 1. Specifically, the transception switch 2 prevents the radar transmission signal from entering into the receiver 4 when transmitting the signal, and prevents the radar reception signal from entering into the transmitter 3 when receiving the signal. An electronic component, such as a circulator for outputting the transmission pulse inputted from the transmitter to the antenna 1 and outputting the reception signal inputted from the antenna 1 to the receiver 4, is used as the transception switch 2.

The transmitter 3 generates, based on a control signal from the timing controller 140 (described later), the radar transmission signal (pulse wave) while changing the transmission interval and outputs each generated radar transmission signal to the transception switch 2. The bandwidth or width of the pulse generated by the transmitter 3 can be changed according to, for example, a display distance of the radar image set by the display unit 8.

The receiver 4 receives the radar reception signal outputted from the antenna 1 via the transception switch 2 according to a receiving timing based on a control signal from the timing controller 140 (described later). The receiver 4 amplifies and A/D (Analog to Digital) converts the radar reception signal when required, and outputs it to the downstream interference remover 5. The illustration of an amplifier and an A/D converter is omitted in the receiver 4 in FIG. 1.

An interference removal is performed on the reception signal inputted into the interference remover 5. The reception signal after the interference removal is pulse-compressed by the matched filer 6, outputted to the wave detector 7 to be demodulated (detected). The interference remover 5 removes the interference signal from the reception signals outputted from the receiver 4, and then outputs the reception signals to the matched filter 6. For the removal of the interference signal, processing using the known and well known arts may be used, such as the art disclosed in JP 1993-027011A.

The matched filter 6 performs a pulse compression in a demodulation of the radar reception signal. Specifically, the matched filter 6 receives the signal outputted from the interference remover 5, and compresses the pulse width of the received signal. The resolution of the radar image displayed on the display unit 8 increases by the compression of the pulse width. Also for the processing of the matched filter, the known and well known arts may be used, such as the art disclosed in JP2002-311126A.

The wave detector 7 detects the output of the matched filter 6, and acquires an amplitude of the signal relating to the target object. The wave detector 7 outputs data S' of the amplitude acquired by the detection to the display unit 8. The display unit 8 includes apparatuses such as a CPU, a memory, and an input apparatus of which illustration is omitted. The display unit 8 stores the data S' of the amplitude acquired from each sweep in an image display memory, reads out the stored data in a predetermined order from the memory, and displays it as an image on, for example, an LCD (Liquid Crystal Display.)

The output from the wave detector 7 is also outputted to the threshold determiner 110. The parameter adjustor 100 sets a parameter to minimize the occurrence of the interference wave based on the output from the wave detector 7, and adjusts, for example, the transmission pulse interval according to the parameter. Specific examples of the parameter include a PRF, a jitter amount, and a jitter pattern. Further specifically, a plurality of parameters is prepared for controlling the transmission pattern of the transmission signals. One or more physical quantities of the PRF, the jitter amount, and the jitter pattern are assumed as the parameters.

With a fixed radar, because a power of a transmitted pulse wave is small, it is common for the transmission pulses having a plurality of different widths depending on a detecting distance to be transmitted, such as a short pulse having a narrow pulse width, a long pulse having a wide pulse width, and a mid-pulse having a width therebetween. A pattern of transmission orders of the pulses having different widths from each other may be added to the parameter.

For each of the signals outputted from the wave detector 7 within a predetermined period of time, for example, signals in one rotation of the antenna, the threshold determiner 110 determines whether the amplitude value exceeds a predetermined threshold at every sampling point of the sweep. Here, the sampling point is in a sweep in every azimuth, and is an extracting point of the reception signal at each distance from the radar.

Figure 2:
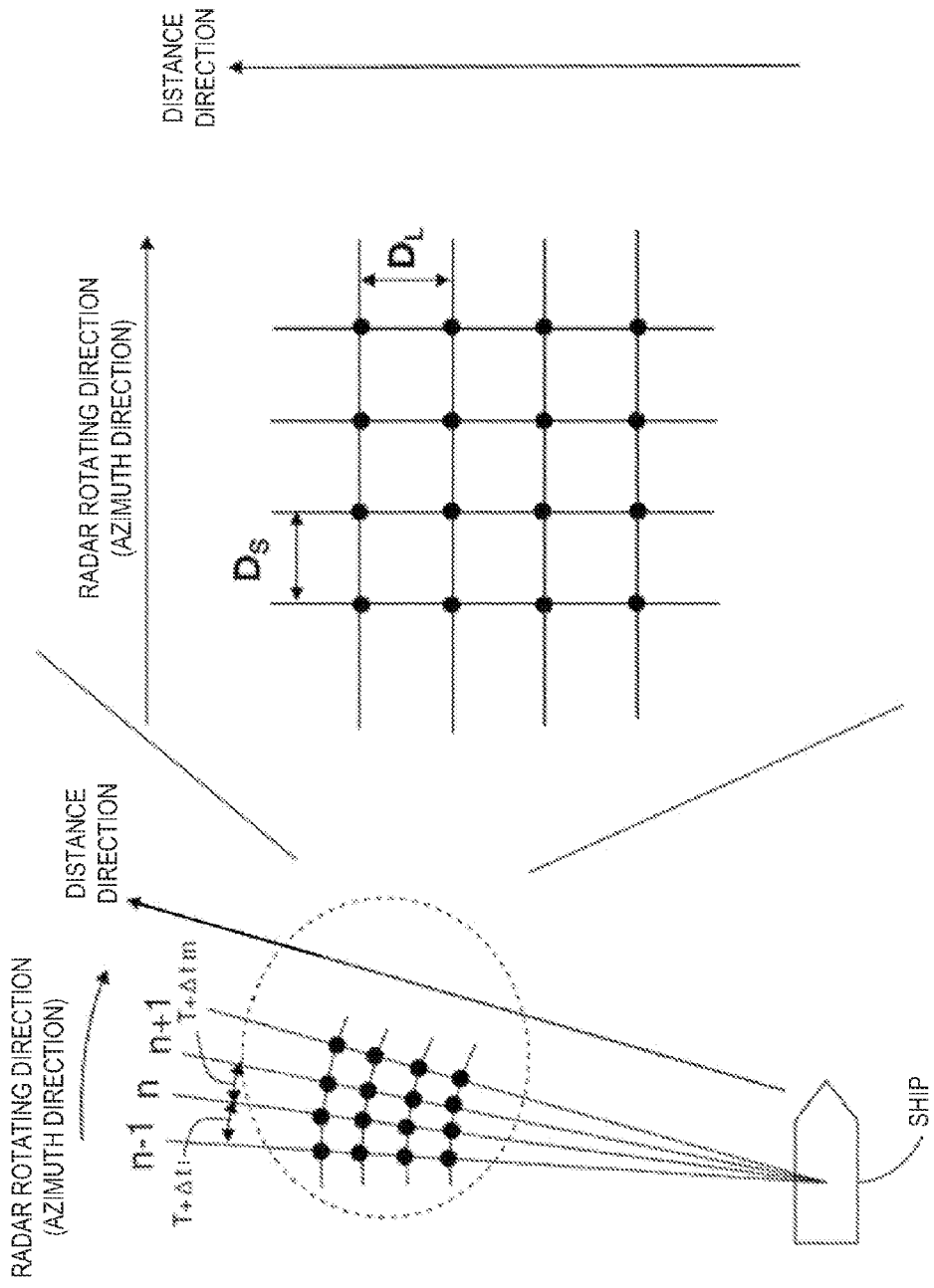
FIG. 2 is a view illustrating sampling points.

In FIG. 2, $D_S$ indicates a sweep interval, and $D_L$ indicates a distance resolution. A signal of a sampling point of which the amplitude value exceeds the threshold includes the target object, an interference wave, a side lobe, a virtual image, etc. The threshold determiner 110 counts the number of sampling points exceeding the threshold and outputs the counted number of sampling points to the parameter selector 130.

In this embodiment, in the parameter setter 120, a plurality of PRFs, jitter amounts, and jitter patterns are stored in advance as a parameter that can be used for removing the interference. Among the parameters stored herein, one parameter, or one set of parameters is selected by the parameter selector 130 (described later), and used for controlling the transmission timing of the transmission pulse.

Figure 3:
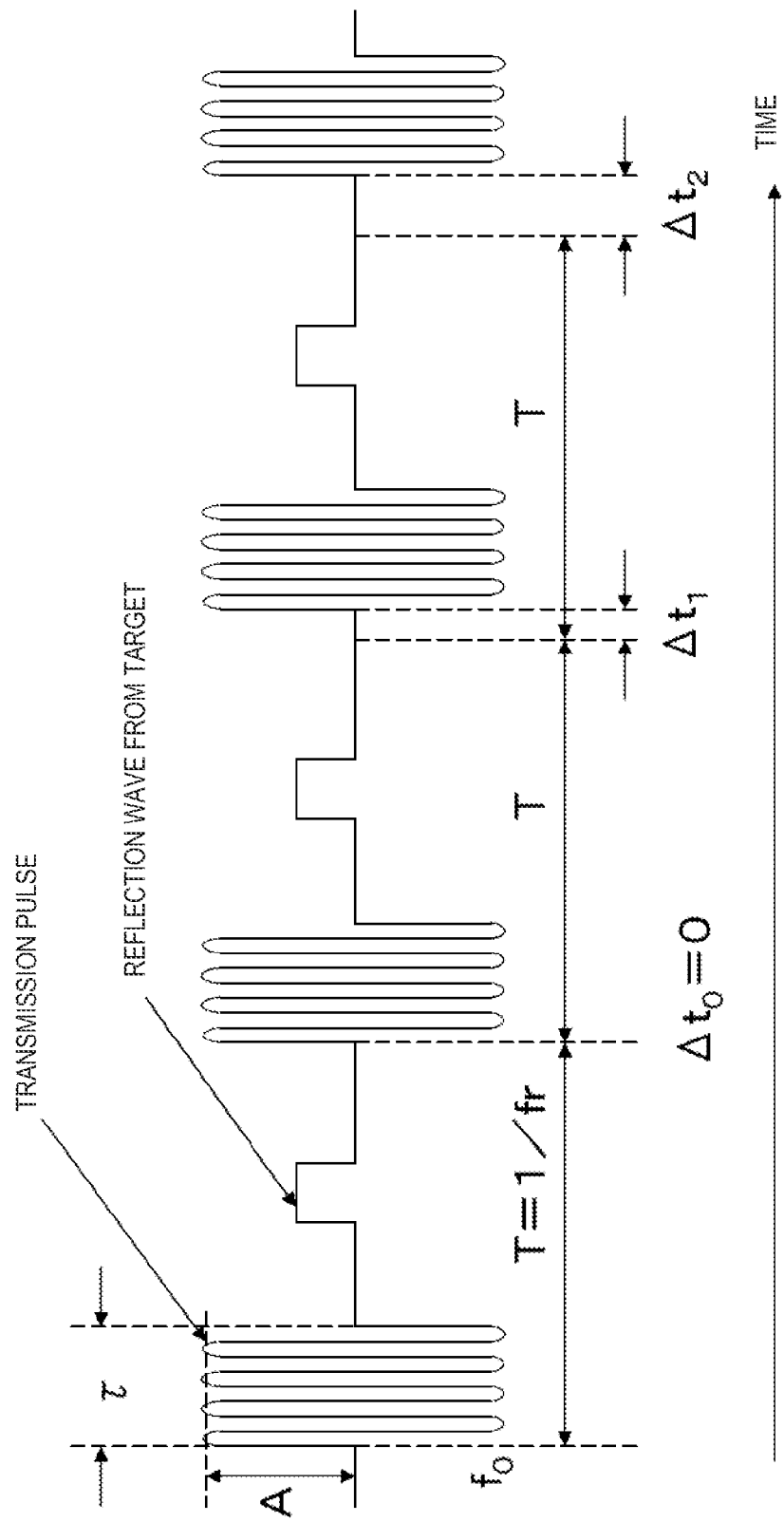
FIG. 3 is a view showing one example of a transmission pulse and a reception wave of the radar apparatus according to the first embodiment.

Here, the parameters stored in the parameter setter 120 are described in detail with reference to FIG. 3. FIG. 3 shows one example of the transmission pulse and the reception wave. Generally, a radar apparatus discharges a transmission pulse at a constant time interval (indicated by "T" in FIG. 3). A reciprocal $f_r$ of T is called the PRF (Pulse Repetition Frequency). The radar apparatus of this embodiment slightly changes the time interval from T in order to remove the interference wave. This change amount of the time interval is called the jitter amount.

In FIG. 3, the second pulse wave from the left indicates a pulse wave with zero jitter amount $\Delta t_0$. $\Delta t_1$ and $\Delta t_2$ in FIG. 3 indicate jitter amounts of the third and fourth pulse waves from the left, respectively. When the radar apparatus changes the jitter amount periodically for every constant number of pulse waves (n), a set of jitter amounts for the n-number of pulse waves is called the jitter pattern. The jitter pattern is indicated as ($\Delta t_0, \Delta t_1, \ldots, \Delta t_{k-1}$), for example. Although the jitter amounts determined by the jitter pattern described above are described to be different from each other, they may have a periodicity in one scan. Such jitter amounts or jitter patterns are stored in the parameter setter 120.

Figure 4A:
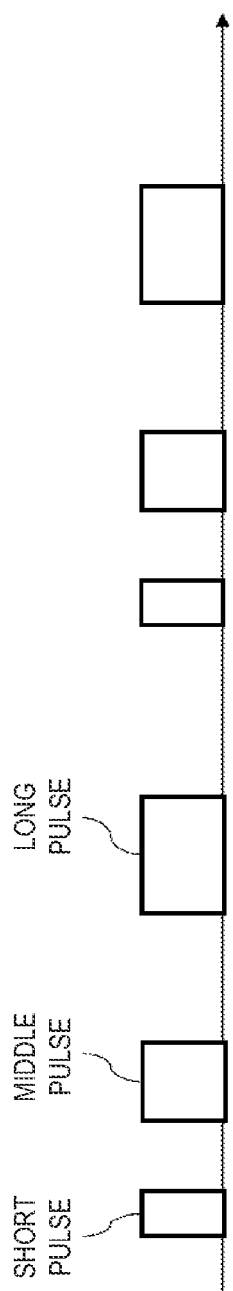
FIGS. 4A to 4C are views showing examples of a combination of transmission orders of the transmission pulses having different pulse widths.
Figure 4B:
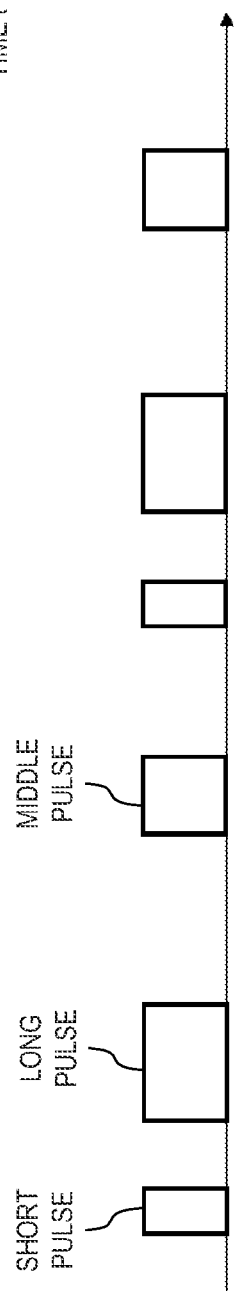
Figure 4C:
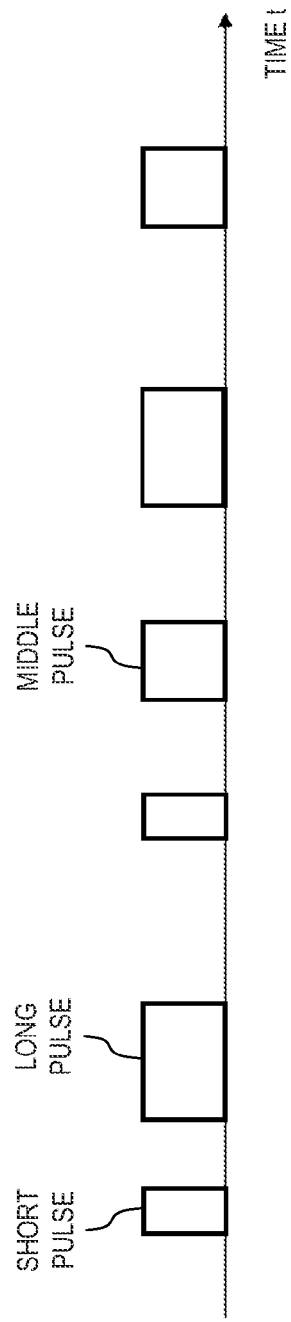

As described above, the plurality of transmission pulses having different widths depending on the detecting distance are transmitted. In this case, the pattern of transmitting orders of the pulses having different widths from each other may be added to the parameter. For example, as shown in FIG. 4A, a transmission pattern of a basic order of a short pulse, a mid-pulse, a long pulse, a short pulse, a mid-pulse, and a long pulse may be added as a parameter. Other than this, a pattern having a different order such as, as shown in FIG. 4B, a short pulse, a long pulse, a mid-pulse, a short pulse, a long pulse, and a mid-pulse; and a pattern having a different order such as, as shown in FIG. 4C, a short pulse, a long pulse, a short pulse, a mid-pulse, a long pulse, and a middle pulse, may also be added as parameters. In addition to these transmission patterns, the transmission timing may be set by redundantly applying the one or more of physical quantities, such as the PRF, the jitter amount, and the jitter pattern, as described above.

Other than the above, for example, a transmission frequency $f_0$, a pulse width $\tau$, and a pulse amplitude A may also serve as parameters indicating a property of a pulse wave. However, because these parameters should be controlled according to a measuring range of the target object and a required distance resolution, they are basically not used for removing interference. Thus, these parameters do not necessarily need to be stored in the parameter setter 120 of this embodiment.

The parameter selector 130 selects, from the parameters (or sets of parameters) stored in the parameter setter 120, a parameter or a set of parameters to minimize the number of sampling points outputted from the threshold determiner 110. The parameter selector 130 may, for example, consecutively apply each parameter stored in the parameter setter 120, and select a parameter to minimize the number of sampling points. Alternatively, the parameter selector 130 may use a GA (Genetic Algorithm) or the like to gradually change the parameter by a small amount in a plus direction or a minus direction and, based on a change in the number of sampling points as a result, obtain an approximate solution of the parameter to minimize the number of sampling points.

The timing controller 140 controls the timing of transmitting each transmission pulse and the timing of receiving each reflection wave from the target object, according to the parameter(s) selected by the parameter selector 130. For this purpose, the timing controller 140 transmits to the transmitter 3 a control signal indicating the output timing of the pulse wave, according to the parameter(s) selected by the parameter selector 130. The timing controller 140 transmits to the receiver 4 a control signal indicating the reception timing of the pulse wave, according to the parameter(s) selected by the parameter selector 130.

Next, an operation of the radar apparatus 1000 of this embodiment is described with reference to FIG. 5, which is a flowchart showing the operation of the radar apparatus 1000.

Figure 5:
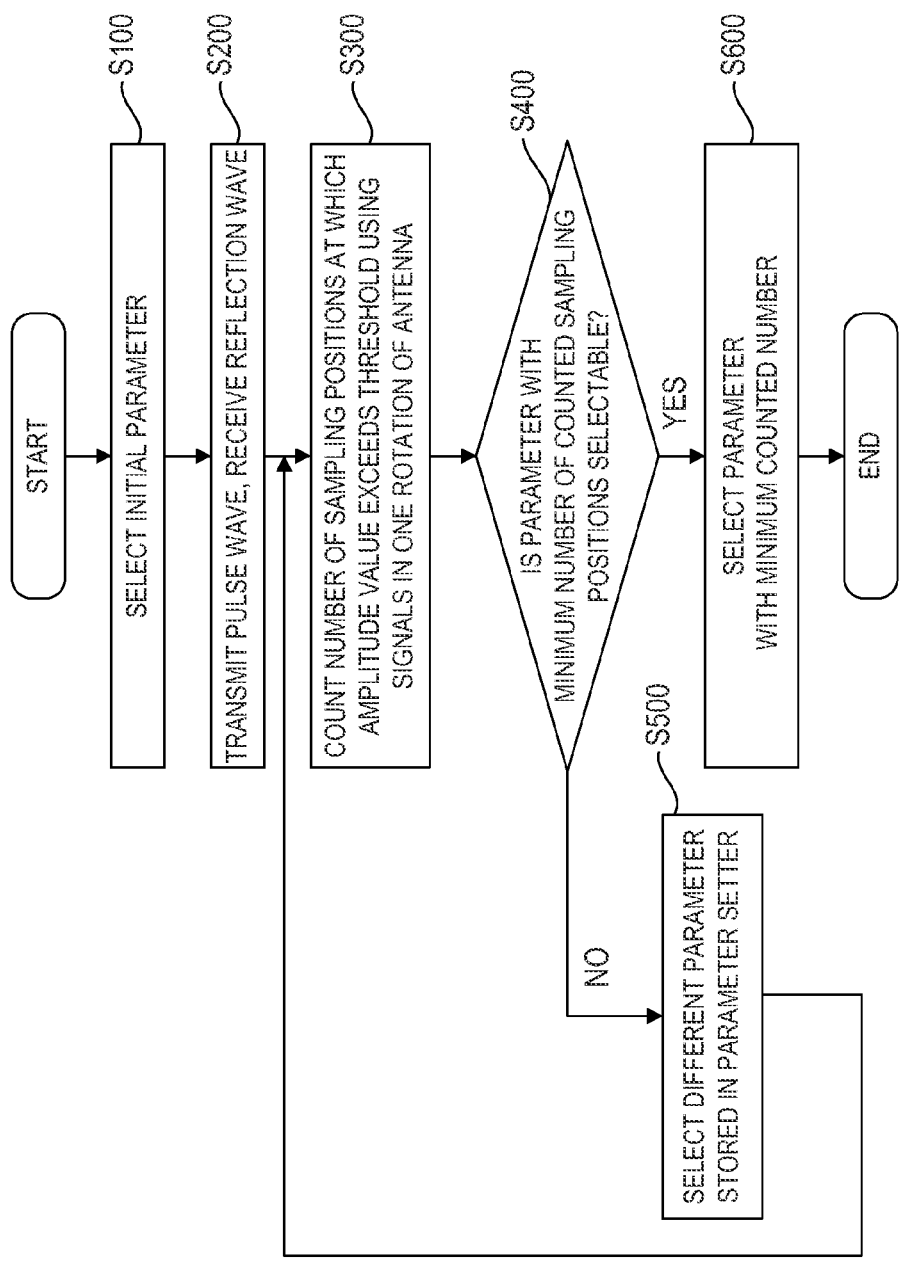
FIG. 5 is a flowchart showing an operation of the radar apparatus according to the first embodiment.

In FIG. 5, firstly, the parameter selector 130 selects one suitable parameter from the parameters stored in the parameter setter 120 (S100). Here, the selected parameter may be one parameter or a set of parameters.

Next, the timing controller 140 transmits the control signal relating to the selected parameter, to the transmitter 3 and the receiver 4. The transmitter 3 transmits the radar transmission signals according to the selected parameter, and the receiver 4 receives the radar reception signals while the radar transmission signal is not transmitted (S200).

Subsequently, the threshold determiner 110 counts the number of sampling points at which the amplitude value exceeds the predetermined threshold, using the signals outputted from the interference remover 5 in one rotation of the antenna, and outputs the number of counted sampling points (hereinafter, referred to as "the counted number") to the parameter selector 130 (S300). The parameter selector 130 determines whether a parameter with the minimum number of counted sampling points is selectable (S400).

Specifically, when the parameter selector 130 consecutively applies each stored parameter in the parameter setter 120 and selects the parameter to minimize the number of sampling points, it is determined whether the number of sampling points at which the amplitude value exceeds the threshold has been counted for all the parameters stored in the parameter setter 120. When the parameter selector 130 obtains the parameter by the perturbation method using the GA and the like, it is determined whether the number of sampling points is increased, in other words, the perturbation has converged, even when the parameter is changed in either the plus direction or the minus direction.

When the parameter with the minimum number of counted sampling points is not selectable (S400: NO), the parameter selector 130 selects a different parameter (S500), and the processing from S200 to S400 is repeated. Note that, the parameter to be selected at S500 may be one parameter or a set of parameters.

When the parameter with the minimum counted number is selectable (S400: YES), the parameter selector 130 selects the parameter with the minimum counted number (S600). When the parameter selector 130 obtains the parameter by the perturbation method using the GA or the like, the parameter selector 130 selects the parameter when the perturbation is converged as the parameter with the minimum counted number. The parameter to be selected at S500 may be one parameter or a set of parameters.

Next, the operation and mechanism of removing the interference wave by the above configuration are described with reference to FIGS. 6 and 7. The basic method of removing the interference wave is to first discriminate the echo signal between the interference wave and the signal from the target object based on whether the data exists continuously at the same distance in a plurality of adjacent sweeps. When the data at the same distance in the adjacent sweeps are continuously at high levels, it is indicated that a target object having a certain size exists in the corresponding area. On the other hand, when the data is discontinuous, because a target object does not appear and disappear in an extremely short period of time, the data is determined to be from the interference wave.

However, if the ship and another ship, or all ships that are in a predetermined area repeat transmitting the transmission pulse for detecting a target object at a constant cycle, a transmission pulse from the other ship(s) is acquired at the same timing as the transmission pulse of the ship, and therefore, the echo signal from the target object and the interference wave cannot be discriminated from each other. FIG. 6 shows such a situation. The parts (a) and (b) in FIG. 6 show data from the plurality of sweeps at the same distance from the radar, and T in FIG. 6 indicates a period of time between a reception timing of a signal of a sweep (n−1) and a reception timing of a signal of the next sweep (n), and a period of time between the reception timing of a signal of the sweep (n) and a reception timing of the signal of the next sweep (n+1).

Figure 6:
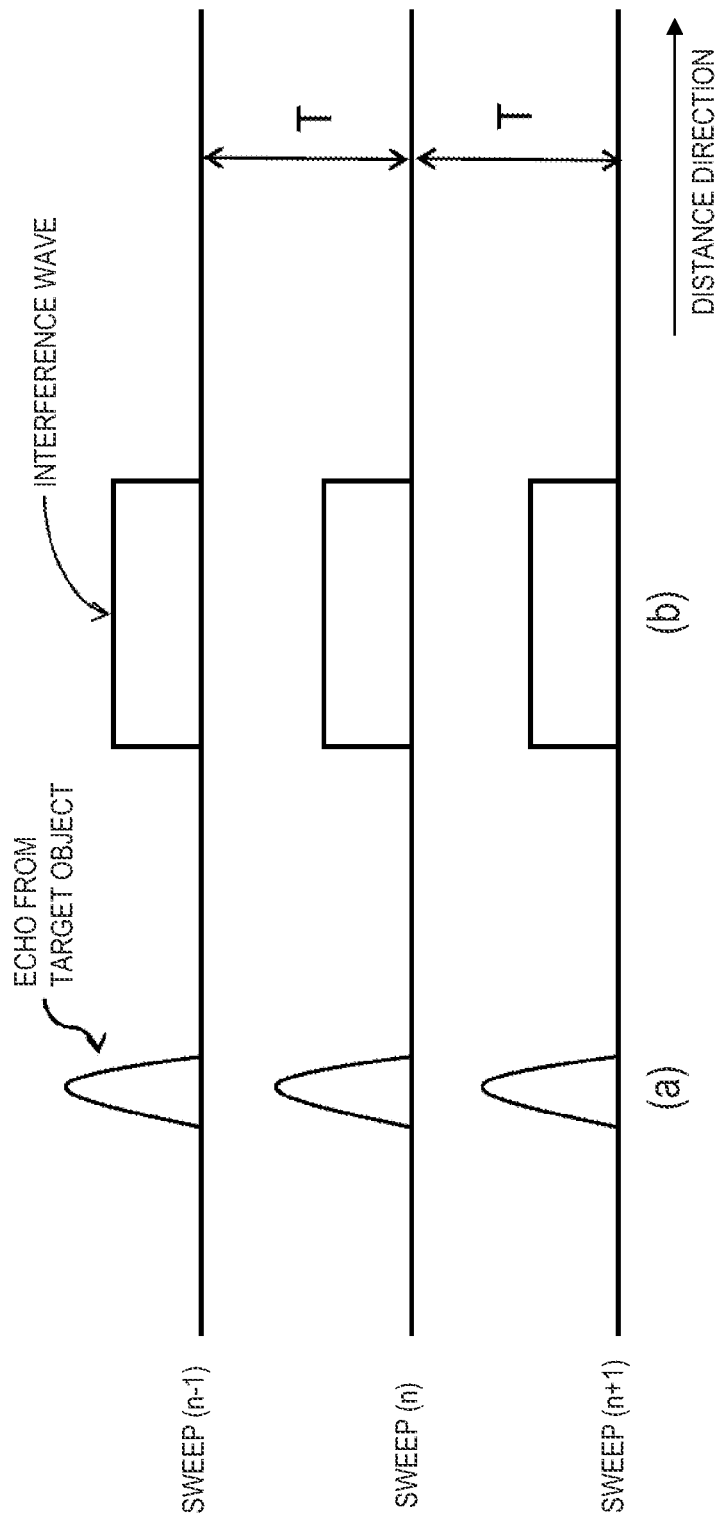
FIG. 6 is views showing one example of a state of reception signals from three adjacent sweeps.

If the transmission repetition frequency of the transmission pulse of the ship is the same as that of the other ship, the state of the reception signal acquired by the ship appears as shown in FIG. 6, and the echo signal and the interference wave are both received at the same timing between the adjacent sweeps. Therefore, the interference wave is determined as the echo signal, and they cannot be discriminated from each other. Even if the ship sets the transmission timing of the transmission pulse of the ship to be different from the other by jitter processing using a predetermined jitter amount, when the jitter amount coincides with the other ship, the reception timing of the interference wave also coincides, and again the interference wave and the echo signal cannot be discriminated from each other.

Figure 7:
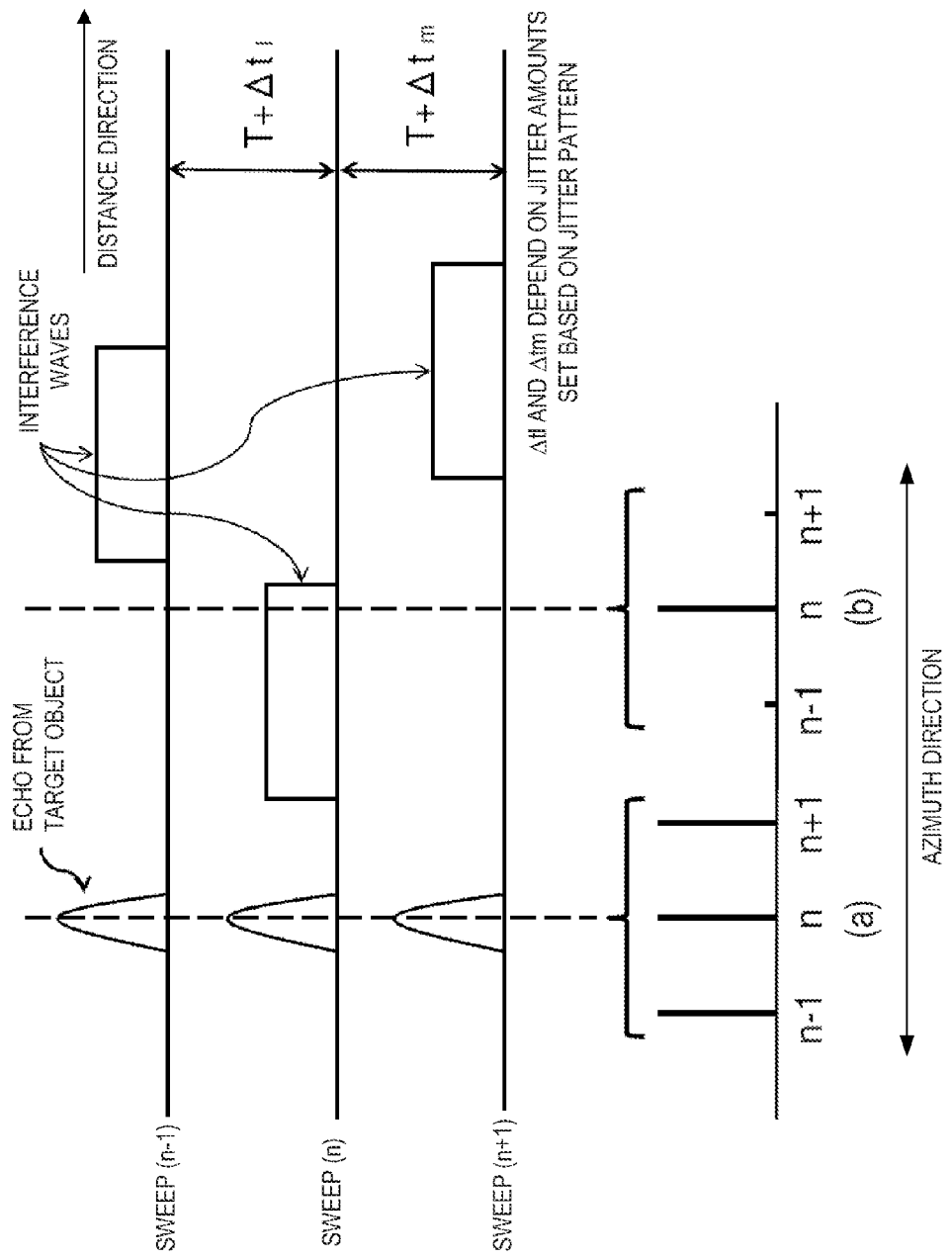
FIG. 7 is views showing another example of the state of the reception signals from the three adjacent sweeps.

On the contrary, FIG. 7 is charts showing the state of the echo signal and the interference signal when the target object detection apparatus of this embodiment is used. In this embodiment, a case where the transmission timing is shifted to be different from the repetition time period (the constant cycle) of transmitting the transmission pulse when the other ship is transmitted. Since the reference timing of the reception is also naturally shifted when the transmission timing of the transmission pulse of the ship is shifted, the echo signal is received at a timing corresponding to the same distance as when the transmission timing is not shifted. For example, when looking at levels of reception signals at positions at the same distance from the radar in three adjacent sweeps, in other words, at adjacent positions in an azimuth direction, the levels are all high as shown in the part (a) in FIG. 7. Therefore, the signal can be distinguished as the echo signal from the target object.

On the other hand, the transmission pulse transmitted from the other ship, in other words, the interference wave, is received at a different timing in each sweep. Therefore, in the example shown in the part (b) in FIG. 7, the level of the reception signal is high in the sweep (n), but low in the other two sweeps (n−1) and (n+1). Therefore, the signal can be distinguished as the interference wave, and not the target object.

The transmission pulse of a magnetron radar is generally about 1 μm for a long pulse. In contrary, a fixed radar uses a long pulse of about a few μm to a few dozen μm. Therefore, it may be difficult to remove the influence from the interference wave by only changing the transmission timing of a transmission pulse.

Therefore, in this embodiment, the plurality of parameters such as the transmission timing and transmission cycle of the transmission pulse are changed. Thus, the influence of the interference is evaluated, the evaluation result is fed back, and the plurality of parameters is set so that the interference wave caused by the other ship(s) is reduced.

In this embodiment, as four parameters to be set, four pulse transmission orders, each order corresponding to when a plurality of the transmission cycles of the transmission pulse exit, when a plurality of the jitter amounts exist, when a plurality of the jitter patterns exit, or when a plurality of the transmission pulse widths exist are assumed. These are stored in the parameter setter 120 shown in FIG. 1 so that a suitable combination can be made for the four parameters in advance. The combinations of the parameters may be set in advance, or may suitably be combined when setting or changing the parameter, by storing the parameter value individually beforehand.

A pattern of one parameter or a combination of a plurality of parameters is selected from the combination patterns, and a value of each parameter is determined for the transmission pulse based on the selected pattern. The set parameter is outputted into the timing controller 140, and the pulse is transmitted from the transmitter 3 according to the timing determined by the timing controller 140.

The echo signal from each transmission pulse is received by the receiver 4 and is discriminated between the signal from the target object and the interference wave by the interference remover 5, to remove the unnecessary signal. The reception signal after the unnecessary signal removal is pulse-compressed via the matched filter and detected. Apart from this, the reception signal after the unnecessary signal removal is also inputted to the threshold determiner 110 in the parameter adjustor 100. Here, the reception signal level at each sampling point is determined whether it exceeds the predetermined threshold. The threshold used herein may be set to be the same value at all the sampling points or the threshold may be set by changing the value based on the clutter state for each distance and azimuth from the radar. Further, the threshold at each sampling point may be changed according to the change in the clutter state.

The number of sampling points exceeding the threshold among targeted sampling points is counted for every pattern of each parameter settings. The detection result is outputted to the parameter selector 130, and the pattern of the parameter(s) with less interference wave is selected based on the detected counted number. As already described, each parameter is set based on the selected new pattern, and thus the transmission timing of the transmission pulse is set.

The targeted sampling points are required to be substantially the same between the parameters to be compared, and all the sampling points in all azimuths may be targeted as well. This is effective when it is assumed to be receiving the influence of interference waves from a plurality of ships, or when a generation source of the interference wave is unknown. Conversely, when the influence of an interference wave from another ship or the like in a specific azimuth is desired to be avoided, it may be such that only the sweeps within a predetermined azimuth range are targeted. Alternatively, within the sweeps, only the sampling points at a predetermined distance from the radar may be set as the targeted sampling points.

In a pattern where the transmission pulse is transmitted under a condition that receives great influence from the interference wave, the counted number of the sampling points exceeding the threshold increases. However, the counted number also increases when the target object that is supposed to be detected exists. Also in this case, since the counted number increases commonly in any pattern due to the target object, by comparing the patterns relative to each other, the suitable pattern for setting the transmission timing of the transmission pulse can be selected.

Figure 8:
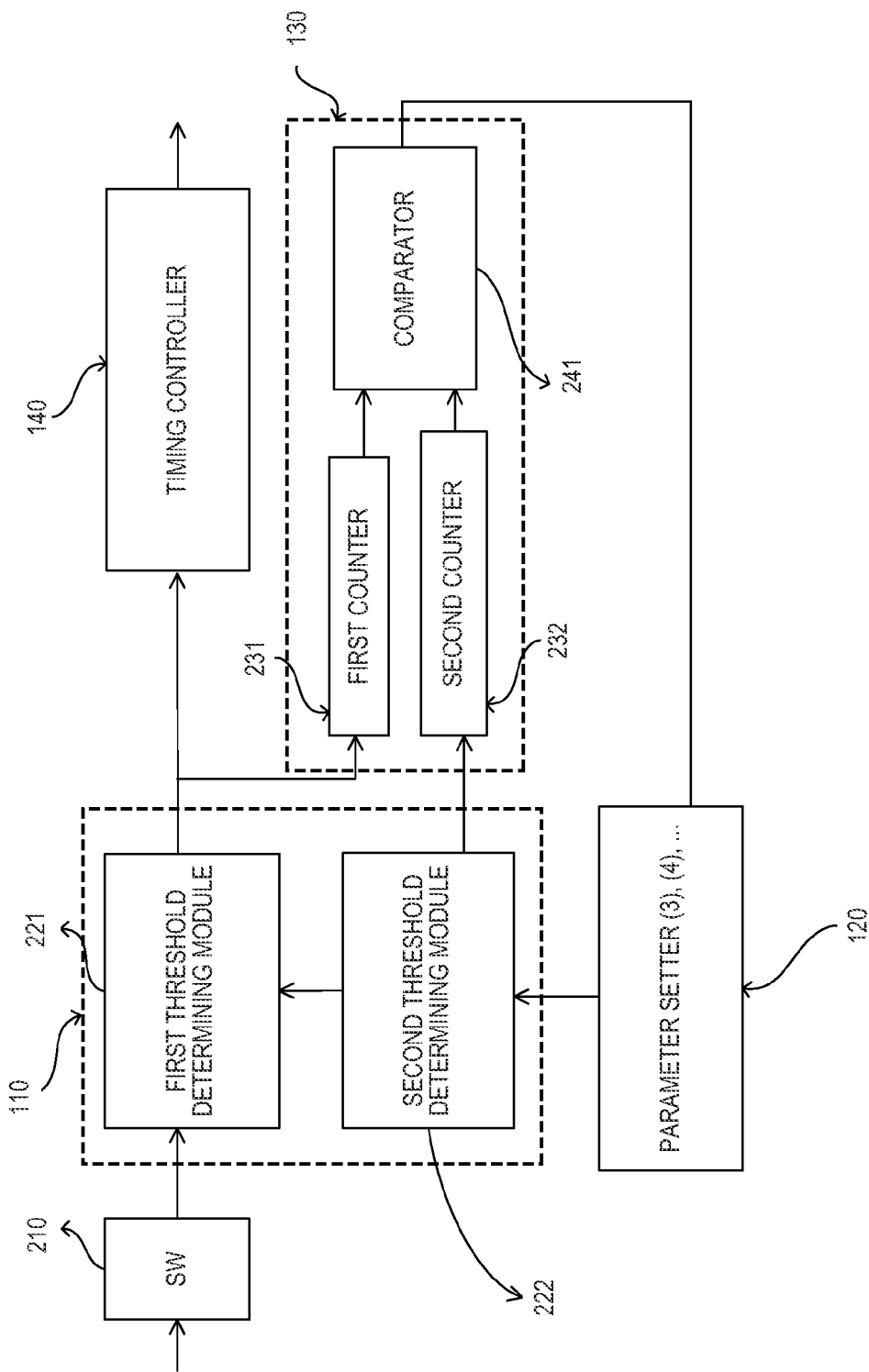
FIG. 8 is a block diagram showing a configuration for performing an interference wave removal.
Figure 9:
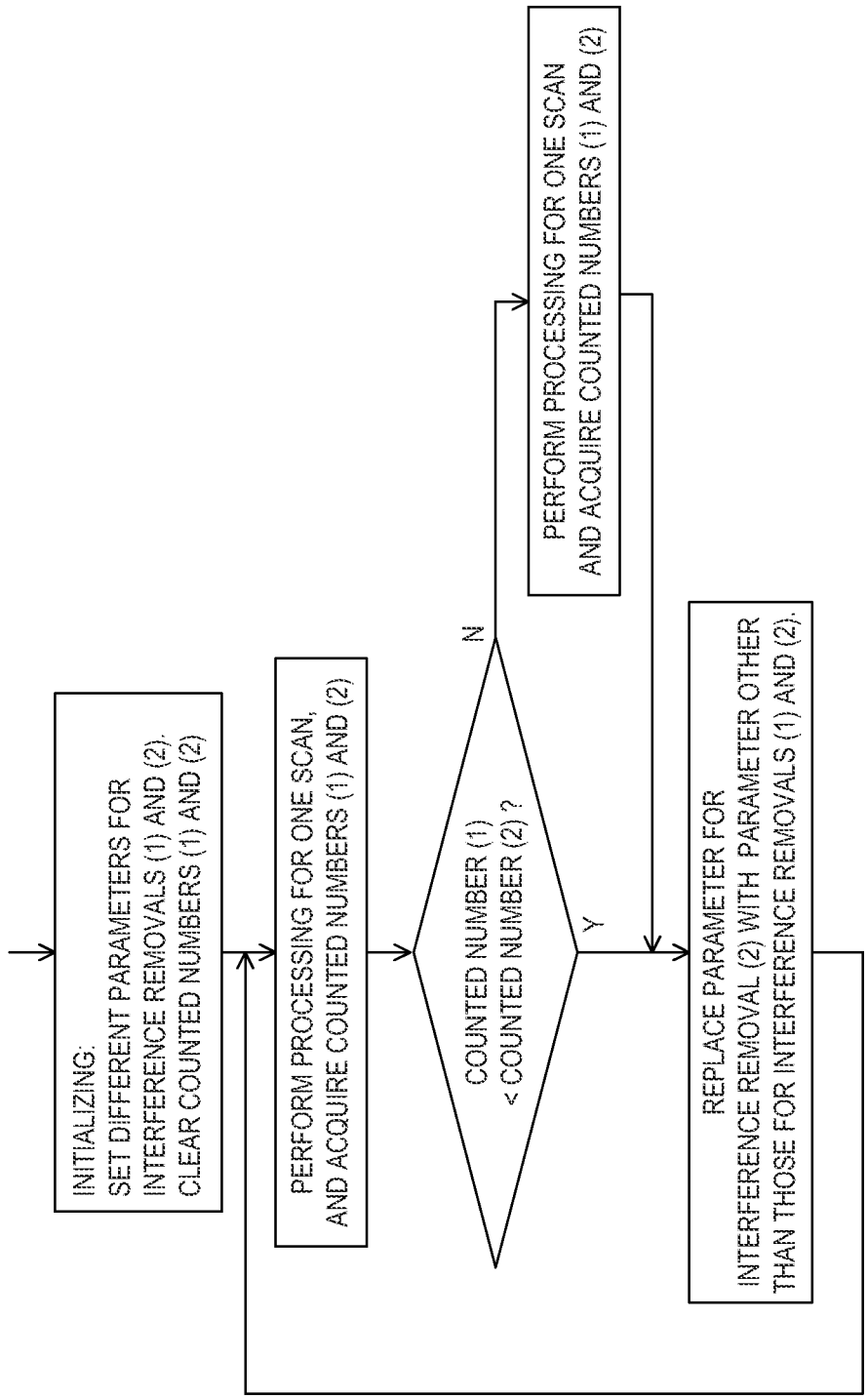
FIG. 9 is a flowchart showing the interference wave removal.

Next, the configuration and process for selecting the above parameter is described with reference to FIGS. 8 and 9. FIG. 8 is a block diagram showing one example of a configuration of the parameter selector of the parameter adjustor, and shows the detailed configuration of the parameter adjustor 100 in FIG. 1. FIG. 9 is a flowchart showing one example of the process of setting the parameter by the parameter setter.

The signal detected by the wave detector 7 in FIG. 1 is outputted into the threshold determiner 110. In the example shown in FIG. 7, the threshold determiner 110 includes first and second threshold determining modules 221 and 222 where the threshold determination is performed based on different parameters from each other. The first threshold determining module 221 performs a threshold determination based on a parameter (1) that is currently selected for display, and the second threshold determining module 222 performs a threshold determination based on a parameter (2) different from the parameter (1). Although examples of physical quantities to be set as the parameters (1) and (2) include, as already described above, the PRF, the jitter amount, and the jitter pattern, it may be one of these to serve as one parameter. Alternatively, by combining a plurality of physical quantities for one parameter, even when a part of the physical quantities matches with the other parameter, the parameters may be different from each other by differentiating with the other part of the physical quantities.

A switch 210 switches the output destination of the reception signal between the first and second threshold determining modules 221 and 222 in every scan essentially. The reception signals of the first scan are used for selecting the parameter, and not for display, regardless of being outputted to either one of the threshold determining modules 221 and 222.

The reception signals acquired in the first scan are outputted to the first threshold determining module 221, and a determination of whether the reception signal exceeds the predetermined threshold is performed for each of the targeted sampling points. The determination is performed at all the sampling points, and the number of points exceeding the threshold is counted by a first counter 231. For the reception signals acquired in the next scan, the switch 210 switches from the first threshold determining module 221 to the second threshold determining module 222, and the signals are outputted thereto. Here, the similar counting is performed by a second counter 232.

It is preferred to set the threshold to a value with which an interference wave can be determined when it is received, and since the threshold changes depending on the distance from the other ship or other conditions, it may suitably be set to a level with which the determination can be performed suitably.

As shown in the flowchart in FIG. 9, both the counted numbers are compared with each other by the comparator 241, and the parameter with the smaller counted number is selected. If the counted number obtained through the first threshold determining module 221 is smaller, it means the influence from the interference wave is smaller with the parameter (1), therefore, the parameter (1) is outputted to the timing controller 140, and the transmission timing of the transmission pulse for the next scan is set.

On the other hand, if the counted number obtained through the second counter 232 is smaller, it can be said that the influence from the interference wave is smaller with the parameter (2). In such a case, the parameter (1) set through the first threshold determining module 221 is replaced with the parameter (2) set through the second threshold determining module 222.

Moreover, for the second threshold determining module 222, the parameter different from either of the parameters stored in the parameter setter 120 is selected. By the above process, the parameters are changed sequentially so that the influence from the interference wave is suppressed. Each parameter is marked with a flag so that the same parameter is not applied for a comparatively short period of time or unless the environment of the other ship that exists around the ship changes. The used parameter can be discriminated by the flag.

However, after some lapse of time, when it can be assumed that the situation regarding the influence from the interference wave from the other ships around the ship has changed, there is no problem in reusing the used parameter. Therefore, the flag is reset, and the same parameter can be applied again.

Here, the first threshold determiner is configured to set a transmission timing currently selected for display, and when changing the parameter, the parameters for both the first and second threshold determining modules 221 and 222 are reset. When changing the parameters, it may also be set to sequentially switch the output origin to the timing controller, between the first and second threshold determining modules 221 and 222. Although the configuration for selecting one of the two parameters is described above, it may be selected from three parameters as well. However, because the frequency of the currently selected data for image processing decreases in this case, regarding this point, it is preferred to select from two parameters.

According to the present invention, even when the ship or the other ship, or both the ships perform the detection by a radar apparatus with a wide pulse width such as the fixed radar, the interference therebetween can still be reduced. Although the occurrence of the interference wave changes depending on the condition regarding, for example, the transmission timing of the transmission pulse of the ship and the transmission timing of the transmission pulse of the other ship, according to the present invention, and the influence can be reduced suitably in response to the change.

Moreover, even in a case where the other ship approaches near the ship and interference wave influences start to occur, by monitoring the counted numbers, the existence of the influence can be quickly known, and the interference can be removed.

As described above, the radar apparatus 1000 of this embodiment automatically selects the parameter to minimize the number of sampling points having the amplitude exceeding the threshold, using the signals in one rotation of the antenna. Thus, the radar apparatus 1000 can automatically adjust the most suitable parameter according to the surrounding situation of the ship. In the above description, the configuration for setting the parameter based on the signals in one rotation of the antenna is described; however, the parameter may also be set per predetermined azimuth range.

When the parameter selector 130 adjusts the parameter by the perturbation method such as GA, the radar apparatus 1000 can efficiently adjust the parameter, and the measurement with the suitable parameter can be swiftly performed.

It is described above, that the radar apparatus 1000 according to this embodiment constantly adjusts the parameter; however, the radar apparatus 1000 may stop adjusting the parameter for a certain period of time after adjusting the parameter once, and then readjust the parameter thereafter. Further, after the radar apparatus 1000 adjusts the parameter once, it may readjust the parameter again when the number of the sampling points having the amplitude value exceeding the threshold is increased for over a certain amount. Furthermore, the radar apparatus 1000 may exclude the matched filter 6.

Moreover, out of the sampling points with high amplitude value, some amplitude values may be caused by an influence of a sidelobe. Therefore, by reducing the negative influence from the sidelobe, the sampling points with high amplitude value due to the interference wave can be effectively removed. In such a case, the parameter selector 130 may select a parameter to minimize the number of sampling points of which the amplitude level exceeding the threshold within an area that is limited by specific azimuths and distance. Thereby, the negative influence from the sampling points with high amplitude value existing locally can be reduced. Here, the parameters are determined in advance, and the values thereof are stored in the parameter setter 120. Alternatively, a parameter setter may be provided, and the parameter may be set based on each counting processing thereby.

In the above embodiment, the case where the ship radar apparatus is applied is described as one example of the radar apparatus. As other examples for the radar apparatus, it is acceptable as long as the radar apparatus can use the pulse radio wave, such as a radar apparatus applied to the use of a weather radar, a coast guard monitoring radar, etc. Moreover, as long as a target object is detected by transmission pulses and there is a possibility of receiving the influence from a transmission pulse from another detection apparatus, it may be applied to, for example, a sonar for detecting a target object underwater by ultrasonic waves <Implementation Example>

The entire or a part of the functional block according to each embodiment described above is realized by a CPU (Central Processing Unit) interpreting and executing program data that can execute the above described processing procedure stored in a memory device such as a ROM (Read-Only Memory), a RAM (Random-Access Memory), hard disk, etc. In this case, the program data may be installed in the memory device via a recording medium, or may be directly executed on the recording medium. Examples of the recording medium include a semiconductor memory (e.g., a ROM, a RAM, and a flash memory), a magnetic disk memory (e.g., a flexible disk and a hard disk), an optical disc memory (e.g., a CD-ROM (Compact Disc Read-Only Memory), a DVD (Digital Versatile Disc), and a BD (Blu-ray Disk™)), and a memory card. The concept of the recording medium includes a communication medium such as a phone line, carrier path, etc.

Moreover, the entire or a part of the functional block according to each embodiment described above is typically realized as an LSI (referred to as, for example, IC, System LSI, Super LSI, Ultra LSI, depending on a difference of the integration) which is an integrated circuit. These may be made into a chip individually or may be made into a chip to include the part of or the entire functional block. Moreover, the method of realizing the integrated circuit is not limited to the LSI, but may also be realized with a private circuit or a general purpose processor. Further, an FPGA (Field Programmable Gate Array) that can be programmed after manufacturing the LSI, and a reconfigurable processor that can reconfigure a connection and setting of the circuit cell inside the LSI, may also be used.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A target object detection apparatus, comprising:
    a transmitter for repeatedly transmitting a transmission pulse at a transmission timing;
    a receiver for receiving a reception signal at a reception timing set based on the transmission timing;
    a threshold determiner for determining whether an amplitude value of the reception signal exceeds a predetermined threshold at every sampling point, and counting the number of sampling points at which the amplitude value of the reception signal exceeds the threshold;
    a parameter setter for setting a plurality of different parameters for controlling the transmission timing;
    a parameter selector for selecting the parameter from the parameters set by the parameter setter, to minimize the number of sampling points counted by the threshold determiner; and
    a timing controller for controlling the transmission timing, based on the parameter selected by the parameter selector.

2. The apparatus of claim 1, wherein the plurality of different parameters includes one or more kinds of physical quantities used for determining the transmission timings of repeatedly transmitting the transmission pulse.

3. The apparatus of claim 2, wherein the number of kinds of physical quantities is at least two of a repetition frequency of the transmission pulse, a jitter amount, and a jitter pattern for determining a combination of the jitter amounts.

4. The apparatus of claim 2, wherein the transmission pulse includes transmission pulses having a plurality of different widths, and
    wherein a transmission order of the transmission pulses having the plurality of different widths is determined based on the parameters.

5. The apparatus of claim 1, wherein the threshold determiner selects a first parameter and a second parameter from the plurality of parameters, and
    wherein the parameter selector compares the counted number obtained with the first parameter, with the counted number obtained with the second parameter, and selects the parameter with smaller counted number.

6. The apparatus of claim 5, wherein the threshold determiner replaces one of the first and second parameters that is non-selected, with a parameter that is neither the first parameter nor the second parameter.

7. The apparatus of claim 6, wherein the parameter setter has a parameter storage for storing the plurality of parameters, and
    wherein the threshold determiner selects the first and second parameters from the plurality of parameters stored in the parameter storage, and the parameter with smaller counted is selected by the parameter selector.

8. The apparatus of claim 4, wherein the threshold determiner includes a first threshold determining module for determining the threshold based on the first parameter, and a second threshold determining module for determining the threshold based on the second parameter,
    wherein the apparatus further comprises a switch for outputting the reception signal at a predetermined cycle while switching the module between the first threshold determining module and the second threshold determining module, and
    wherein the threshold determination is performed alternately by the first threshold determining module and the second threshold determining module at the predetermined cycle.

9. The apparatus of claim 8, wherein when the first parameter is selected as a result of the threshold determination, the first parameter is outputted to the timing controller, and
    wherein when the second parameter is selected, the first parameter is replaced with the second parameter, and the second parameter is replaced with a third parameter that is different from the first and second parameters.

10. The apparatus of claim 8, wherein when a parameter newly selected as the third parameter is different from all the replaced parameters.

11. The apparatus of claim 1, wherein the transmission pulse is an electromagnetic pulse, and the transmitter includes a rotary unit for changing an azimuth at which the transmission pulse is transmitted at a predetermined cycle.

12. The apparatus of claim 1, wherein the transmission pulse is an electromagnetic pulse, and the transmitter includes a rotary unit for transmitting the transmission pulse in the entire circumferential direction at a predetermined cycle.

13. The apparatus of claim 12, wherein the sampling points are counted for a predetermined azimuth range.

14. The apparatus of claim 12, wherein the sampling point is within a predetermined distance range from the transmitter.

15. The apparatus of claim 14, wherein the predetermined distance range is set to correspond to a period of time based on the transmission timing of the transmission pulse, the period of time being required for the transmission pulse transmission in the entire circumferential direction.

16. The apparatus of claim 1, wherein the parameter setter sets at least three kinds of parameters, and
wherein the parameter selector selects the parameter to minimize the counted number among the at least three kinds of parameters.

17. The apparatus of claim 1, wherein the parameter selector selects the parameter every time a counted number of sampling points reaches a predetermined number.

18. The apparatus of claim 1, wherein when a predetermined number of sampling points is counted in addition to the counted number obtained with the selected parameter, the parameter selector compares the counted number between the selected parameter and each of the other parameters to select a new parameter.

19. A transmission pulse control device provided to a target object detection apparatus for detecting a target object by repeatedly transmitting a transmission pulse and receiving a reception signal from the target object, the device controlling the transmission timing, the device comprising:
a threshold determiner for determining whether an amplitude value of the reception signal exceeds a predetermined threshold at every sampling point, and counting the number of sampling points at which the amplitude value of the reception signal exceeds the threshold;
a parameter setter for setting a plurality of different parameters for controlling the transmission timing;
a parameter selector for selecting the parameter from the parameters set by the parameter setter, to minimize the number of sampling points counted by the threshold determiner; and
a timing controller for controlling the transmission timing and the reception timing from the target object, based on the parameter selected by the parameter selector.

20. A method of detecting a target object by repeatedly transmitting a transmission pulse and receiving a reception signal from the target object, comprising:
repeatedly transmitting with a transmitter the transmission pulse at a transmission timing;
receiving the reception signal with a receiver at a reception timing set based on the transmission timing;
setting a plurality of different parameters with a parameter setter for controlling the transmission timing, the plurality of different parameters including the parameter for determining the transmission timing;
determining, with a threshold determiner, based on each of the plurality of different parameters, whether an amplitude value of the reception signal exceeds a predetermined threshold at every sampling point, and counting the number of sampling points at which the amplitude value of the reception signal exceeds the threshold;
selecting with a parameter selector the parameter from the plurality of different parameters to minimize the number of sampling points; and
controlling with a timing controller the transmission timing and the reception timing from the target object, based on the selected parameter.

* * * * *